United States
Nakagawa et al.

[11] 3,749,478
[45] July 31, 1973

[54] LENS SYSTEM HAVING A LARGE APERTURE AND LONG FOCAL LENGTH

[75] Inventors: Jihei Nakagawa; Sumio Nakamura, both of Tokyo, Japan

[73] Assignee: Olympus Optical Company Limited, Tokyo, Japan

[22] Filed: Apr. 7, 1972

[21] Appl. No.: 241,927

[30] Foreign Application Priority Data
Apr. 10, 1971 Japan.............................. 46/22087

[52] U.S. Cl................................. 350/216, 350/176
[51] Int. Cl. ............................................... G02b 9/60
[58] Field of Search........................................ 350/216

[56] References Cited
UNITED STATES PATENTS
2,949,821  8/1960  Hayes et al. ....................... 350/216
2,861,500  11/1958  Tronnier......................... 350/216 X
3,236,151  2/1966  Solisch et al....................... 350/216

Primary Examiner—John K. Corbin
Attorney—Eric H. Waters et al.

[57] ABSTRACT

A lens system having a large aperture and a long focal length, which is constructed as five components and five lenses and consists of first, second and third components of positive meniscus lenses, each having at its object side a convex surface, a fourth component of a negative meniscus lens that has at its object side a convex surface, and a fifth component of a positive lens separated from the fourth component by a large air space, all lenses being arranged in succession from the side of an object, and which is defined by the following five conditions, i.e., 1. $n_1 + n_2 + n_3/3 > 1.6$,
2. $3f > f_3 > 4f_{1,2,3}$.
3. $n_4 > 1.7$,
4. $0.24f > d_1 + d_2 + d_3 + d_4 + d_5 + d_6 > 0.12f$, and
5. $\nu_1 > 50$, $\nu_2 > 50$ and $\nu_3 > 48$ where $f$ is a composite focal length of the total lens system, $f_3$ is a focal length of the third component, $f_{1,2,3}$ is a composite focal length of the first, second and third components, $n_1, n_2, \ldots n_5$ are refractive indices of the successive lenses counted from the object side, $\nu_1, \nu_2, \ldots \nu_5$ are Abbe's numbers of the successive lenses counted from the object side, and $d_1, d_2, \ldots d_9$ are axial thicknesses of the successive lenses or air spaced between the successive lenses.

3 Claims, 7 Drawing Figures

FIG_3a  FIG_3b  FIG_3c

F2.8   12°10'   12°10' d   g   ΔS   Δm

-0.002  0  0.002    -0.002  0  0.002    -2%  0  2%
  mm       mm         mm       mm

LENS SYSTEM HAVING A LARGE APERTURE AND LONG FOCAL LENGTH

This invention relates to a lens system having a large aperture and a long focal length.

Heretofore, it has been well known to construct one of the Ernostar type lens systems having a long focal length by a first component of a positive lens, a second component of a composite positive meniscus lens, meniscus third component of mensicus negative meniscus lens, and meniscus fourth component of positive lens. This type of lens system has the disadvantage that if the telephoto ratio (the ratio of the distance between the front surface of the first lens component and the film surface to the focal length) is made small, the various aberrations become degraded with the result that a large aperture could not be obtained.

The object of the invention is, by breaking up the second component of composite positive meniscus lens of the conventional lens system into two lenses and by changing the composite negative lens having a weak refractive power into a positive meniscus lens having a weak refractive power, to provide a lens system having an aperture ratio of the order of 2.8 and a long focal length whose telephoto ratio is on the order of 0.93 and having significantly corrected aberrations, and more particularly having significantly corrected coma and astigmatism with respect to light rays having a large incident angle.

A feature of the invention is the provision of a lens system having a large aperture and a long focal length, which is constructed as five components and five lenses and consists of first, second and third components of five positive meniscus lenses, each having at its object side a convex surface, a fourth component of a negative meniscus lens that has at its object side a convex surface, and a fifth component of a positive lens separated from the fourth lens component by a large air space, all lenses being arranged in succession from the side of an object, and which is defined by the following five conditions, i.e.

1. $n_1+n_2+n_3/3 > 1.6$,
2. $3f > f_3 > 4f_{1,2,3}$,
3. $n_4 > 1.7$,
4. $0.24f > d_1+d_2+d_3+d_4+d_5+d_6 > 0.12f$, and
5. $\nu_1 > 50$, $\nu_2 > 50$ and $\nu_3 < 48$ where $f$ is a composite focal length of the total lens system, $f_3$ is a focal length of the third lens component, $f_{1,2,3}$ is a composite focal length of the first, second and third lens components, $n_1, n_2, \ldots n_5$ are refractive indices of the successive lenses counted from the object side, $\nu_1, \nu_2 \ldots \nu_5$ are Abbe's numbers of the successive lenses counted from the object side, and $d_1, d_2, \ldots d_9$ are axial thicknesses of the successive lenses or air spaces between the successive lenses.

For a better understanding of the invention, the same will be explained by reference to the accompanying drawings, in which:

FIGS. 3a to 3c show aberration characteristic curves of another exemplary embodiment of the invention.

Figure 1:
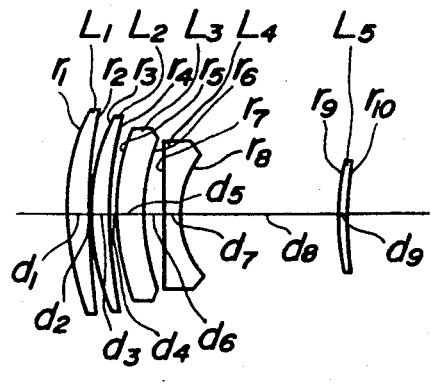
FIG. 1 shows in cross-section a lens system having a large aperture and a long focal length constructed according to the invention.

Referring to the drawings, a lens system having a large aperture and a long focal length according to the invention is shown in FIG. 1 in which $L_1$, $L_2$ and $L_3$ designate first, second and third components of positive meniscus lenses, each having at its object side a convex surface, respectively. $L_4$ shows a fourth component of a negative meniscus lens that has at its object side a convex surface. $L_5$ illustrates a fifth component a positive lens separated from the fourth component $L_4$ by a large air space $d_8$. These lenses $L_1$, $L_2$, $L_3$, $L_4$ and $L_5$ are arranged in succession from the side of an object (not shown).

In accordance with the invention, the refractive indices, focal lengths and Abbe's numbers of the successive lenses are chosen such that they are defined by the following five conditions, i.e.

1. $n_1+n_2+n_3/3 > 1.6$,
2. $3f > f_3 > 4f_{1,2,3}$,
3. $n_4 > 1.7$,
4. $0.24f > d_1+d_2+d_3+d_4+d_5+d_6 > 0.12f$, and
5. $\nu_1, \nu_2 > 50$, $\nu_3 < 48$ where $f$ is a composite focal length of the total lens system, $f_3$ is a focal length of the third component lens, $f_{1,2,3}$ is a composite focal length of the first, second and third components lenses, $n_1, n_2, \ldots n_5$ are refractive indices of the successive lenses counted from the object side, $\nu_1, \nu_2, \ldots \nu_5$ are Abbe's numbers of the successive lenses counted from the object side, and $d_1, d_2, \ldots d_9$ are axial thicknesses of the successive lenses and air spaces between the successive lenses.

In accordance with the invention the use of a lens having a relatively high refractive index as defined by the condition 1 as the three positive lenses of the first, second and third lens components renders it possible to provide excellent correction of spherical aberration, coma, etc. If the condition 1 is not satisfied, the radii of curvatures of the first, second and third lens components become small, thereby producing spherical aberration, with the result that it is difficult to obtain a lens system having a large aperture. If it is intended to correct such spherical aberration by increasing curvatures of these lenses, satisfactory removal of the coma and astigmatism could not be attained.

The condition 2 shows that the focal length $f_3$ of the third lens components $L_3$ is relatively long if compared with the first and second groups of lenses $L_1$ and $L_2$. If $f_3 > 3f$, the share of the third lens component $L_3$ to correct the aberrations becomes decreased so that the share of the first and second lens components $L_1$ and $L_2$ to correct the aberrations becomes increased, whereby favorable correction of coma, etc. could not be effected. If $f_3 < 4f_{1,2,3}$, it is difficult to make the telephoto ratio small and to correct the various aberrations.

The condition 3 that the refractive index $n_4$ of the fourth lens component $L_4$ should be larger than 1.7 prevents the Petzval sum from becoming small. Thus, a suitable increase of the radius of curvature of the fourth component of a negative lens $L_4$ is capable of significantly correcting the coma. If $n_4$ is smaller than 1.7, the Petzval sum becomes surplus in correction so that the definition resolving power in the sagittal direction on the periphery of the picture surface becomes degraded. Moreover, if $n_4 < 1.7$, the radius of curvature $r_8$ is increased to degrade the aberration out of axis.

In the condition 4, if $d_1+d_2+d_3+d_4+d_5+d_6$ is smaller than $0.12f$, it is not only difficult to make the telephoto ratio small, but also the various aberrations become degraded. If $d_1+d_2+d_3+d_4+d_5+d_6$ is larger than $0.24f$, the Petzval sum becomes negative which is not desirable.

In the condition 5, $\nu_1 > 50$ and $\nu_2 > 50$ are conventional means of correcting the chromatic aberration and $\nu_3 < 48$ is consistent with the condition 2. The condition 5 is effective to significantly correct both the aberrations on axis and the magnification chromatic aberration. If $\nu_1 < 50$ and $\nu_2 < 50$, it is impossible to make $\nu_3 < 48$. If $\nu_3 > 48$, both the aberrations on axis and the magnification chromatic aberration could not be significantly corrected.

The invention will now be described with reference to the following examples.

EXAMPLE 1

| | | | |
|---|---|---|---|
| $r_1=0.3847$ | | | |
| | $d_1=0.0392$ | $n_1=1.63854$ | $\nu_1=55.38$ |
| $r_2=1.5003$ | | | |
| | $d_2=0.0007$ | | |
| $r_3=0.3465$ | | | |
| | $d_3=0.0317$ | $n_2=1.617$ | $\nu_2=62.79$ |
| $r_4=0.5969$ | | | |
| | $d_4=0.0025$ | | |
| $r_5=0.3748$ | | | |
| | $d_5=0.0638$ | $n_3=1.70154$ | $\nu_3=41.1$ |
| $r_6=0.4620$ | | | |
| | $d_6=0.0260$ | | |
| $r_7=0.9685$ | | | |
| | $d_7=0.0409$ | $n_4=1.7847$ | $\nu_4=26.22$ |
| $r_8=0.1957$ | | | |
| | $d_8=0.2758$ | | |
| $r_9=0.6435$ | | | |
| | $d_9=0.015$ | $n_5=1.80518$ | $\nu_5=25.43$ |
| $r_{10}=1.8672$ | | | |
| $f=1.0$ | $f_{1,2,3}=0.392$ | $f_3=2.176$ | |

Figures 2A, 2B, 2C:
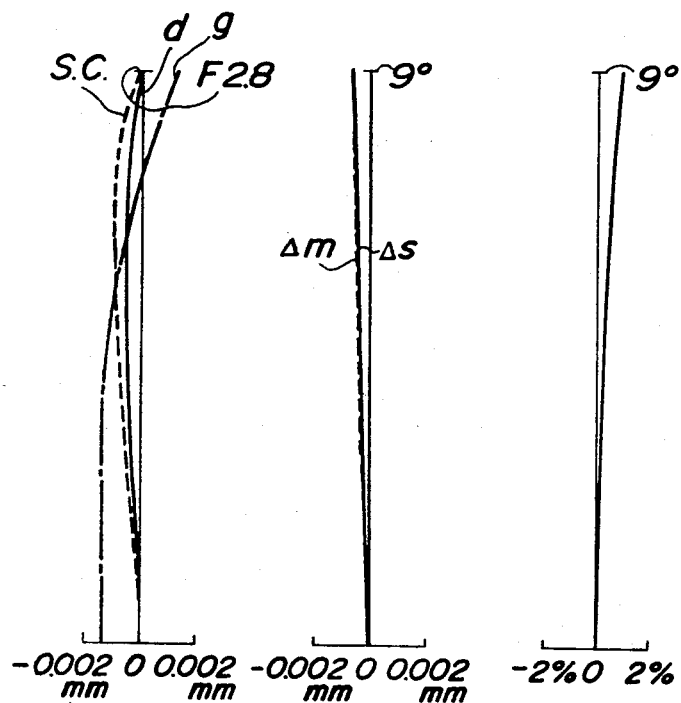
FIGS. 2a to 2c show aberration characteristic curves of one exemplary embodiment of the invention.

The aberration characteristic curves of the present embodiment are shown in FIGS. 2a, 2b and 2c. FIG. 2a shows the spherical aberrations and the sine condition (S.C.), FIG. 2b shows the astigmatisms and FIG. 2c shows the distortion.

As seen from these aberration characteristic curves, the lens system according to the present embodiment makes it possible to significantly correct various aberrations.

EXAMPLE 2

| | | | |
|---|---|---|---|
| $r_1=0.4011$ | | | |
| | $d_1=0.0472$ | $n_1=1.58913$ | $\nu_1=61.11$ |
| $r_2=2.3231$ | | | |
| | $d_2=0.0042$ | | |
| $r_3=0.3213$ | | | |
| | $d_3=0.0336$ | $n_2=1.56873$ | $\nu_2=63.16$ |
| $r_4=0.5016$ | | | |
| | $d_4=0.0025$ | | |
| $r_5=0.3406$ | | | |
| | $d_5=0.0639$ | $n_3=1.70154$ | $\nu_3=41.1$ |
| $r_6=0.4159$ | | | |
| | $d_6=0.0261$ | | |
| $r_7=0.8450$ | | | |
| | $d_7=0.0389$ | $n_4=1.7847$ | $\nu_4=26.22$ |
| $r_8=0.1960$ | | | |
| | $d_8=0.2578$ | | |
| $r_9=0.6486$ | | | |
| | $d_9=0.0255$ | $n_5=1.7847$ | $\nu_5=26.22$ |
| $r_{10}=1.7995$ | | | |
| $f=1.0$ | $f_{1,2,3}=0.407$ | $f_3=2.0$ | |

The aberration characteristic curves of the present modified embodiment are shown in FIGS. 3a, 3b and 3c. FIG. 3a shows the spherical aberrations, FIG. 3b shows the astigmatisms, and FIG. 3c shows the distortion.

As seen from these aberration characteristic curves, the lens system according to the present modified embodiment also makes it possible to significantly correct the aberrations.

What is claimed is:

1. A lens system having a large aperture and a long focal length, which is constructed as five components and five lenses and consists of first, second and third components of positive meniscus lenses, each having at its object side a convex surface, a fourth component of a negative meniscus lens that has at its object side a convex surface, and a fifth component of a positive meniscus lens separated from the fourth component by a large air space, all lenses being arranged in succession from the side of an object, and which is defined by the following five conditions, i.e.,
   1. $n_1+n_2+n_3/3 > 1.6$,
   2. $3f > f_3 > 4f_{1,2,3}$,
   3. $n_4 > 1.7$,
   4. $0.24f > d_1+d_2+d_3+d_4+d_5+d_6 > 0.12f$, and
   5. $\nu_1 > 50$, $\nu_2 > 50$ and $\nu_3 < 48$ where $f$ is a composite focal length of the total lens system, $f_3$ is a focal length of the third components, $f_{1,2,3}$ is a composite focal length of the first, second and third components, $n_1, n_2 \ldots n_5$ are refractive indices of the successive lenses counted from the object side, $\nu_1, \nu_2, \ldots \nu_5$ are Abbe's numbers of the successive lenses counted from the object side, and $d_1, d_2, \ldots d_9$ are axial thicknesses of the successive lenses or air spaces between the successive lenses.

2. A lens system having a large aperture and a long focal length, which is constructed as five components and five lenses and consists of first, second and third components of positive meniscus lenses, each having at its object side a convex surface, a fourth component of a negative meniscus lens that has at its object side a convex surface, and a fifth component of a positive lens separated from the fourth component by a large air space, all lenses being arranged in succession from the side of an object, and which is defined by the following five conditions, i.e.,
   1. $n_1+n_2+n_3/3 > 1.6$,
   2. $3f > f_3 > 4f_{1,2,3}$,
   3. $n_4 > 1.7$,
   4. $0.24f > d_1+d_2+d_3+d_4+d_5+d_6 > 0.12f$, and
   5. $\nu_1 > 50$, $\nu_2 > 50$ and $\nu_3 < 48$ where $f$ is a composite focal length of the total lens system, $f_3$ is a focal length of the third components, $f_{1,2,3}$ is a composite focal length of the first, second and third components, $n_1, n_2, \ldots n_5$ are refractive indices of the successive lenses counted from the object side, $\nu_1, \nu_2, \ldots \nu_5$ are Abbe's numbers of the successive lenses counted from the object side, and $d_1, d_2, \ldots d_9$ are axial thicknesses of the successive lenses or air spaces between the successive lenses, wherein $f=1.0$, $f_{1,2,3}=0.392$ and $f_3=2.176$; and wherein $r_1$ to $r_{10}$, $d_1$ to $d_9$, $n_1$ to $n_5$ and $\nu_1$ to $\nu_5$ are defined by the following values:

| | | | |
|---|---|---|---|
| $r_1=0.3847$ | | | |
| | $d_1=0.0392$ | $n_1=1.63854$ | $\nu_1=55.38$ |
| $r_2=1.5003$ | | | |
| | $d_2=0.0007$ | | |
| $r_3=0.3465$ | | | |
| | $d_3=0.0317$ | $n_2=1.617$ | $\nu_2=62.79$ |
| $r_4=0.5969$ | | | |
| | $d_4=0.0025$ | | |
| $r_5=0.3748$ | | | |
| | $d_5=0.0638$ | $n_3=1.70154$ | $\nu_3=41.1$ |
| $r_6=0.4620$ | | | |
| | $d_6=0.0260$ | | |
| $r_7=0.9685$ | | | |
| | $d_7=0.0409$ | $n_4=1.7847$ | $\nu_4=26.22$ |
| $r_8=0.1957$ | | | |
| | $d_8=0.2758$ | | |
| $r_9=0.6435$ | | | |
| | $d_9=0.015$ | $n_5=1.80518$ | $\nu_5=25.43$ |
| $r_{10}=1.8672$ | | | |

3. A lens system having a large aperture and a long focal length, which is constructed as five components and five lenses and consists of first, second and third components of positive meniscus lenses, each having at its object side a convex surface, a fourth component of a negative meniscus lens that has at its object side a convex surface, and a fifth component of a positive lens separated from the fourth component by a large air space, all lenses being arranged in succession from the side of an object, and which is defined by the following five conditions, i.e.
1. $n_1+n_2+n_3/3 > 1.6$,
2. $3f > f_3 > 4f_{1,2,3}$
3. $n_4 > 1.7$,
4. $0.24f > d_1+d_2+d_3+d_4+d_5+d_6 > 0.12f$, and
5. $\nu_1 > 50$, $\nu_2 > 50$ and $\nu_3 < 48$ where $f$ is a composite focal length of the total lens system, $f_3$ is a focal length of the third components, $f_{1,2,3}$ is a composite focal length of the first, second and third components, $n_1, n_2 \ldots n_5$ are refractive indices of the successive lenses counted from the object side, $\nu_1, \nu_2, \ldots \nu_5$ are Abbe's numbers of the successive lenses counted from the object side, and $d_1, d_2, \ldots d_9$ are axial thicknesses of the successive lenses or air spaces between the successive lenses; wherein $f=1.0$, $f_{1,2,3}=0.407$ and $f_3=2.0$; and wherein $r_1$ to $r_{10}$, $d_1$ to $d_9$, $n_1$ to $n_5$ and $\nu_1$ to $\nu_5$ are defined by the following values:

| | | | |
|---|---|---|---|
| $r_1=0.4011$ | | | |
| | $d_1=0.0472$ | $n_1=1.58913$ | $\nu_1=61.11$ |
| $r_2=2.3231$ | | | |
| | $d_2=0.0042$ | | |
| $r_3=0.3213$ | | | |
| | $d_3=0.0336$ | $n_2=1.56873$ | $\nu_2=63.16$ |
| $r_4=0.5016$ | | | |
| | $d_4=0.0025$ | | |
| $r_5=0.3406$ | | | |
| | $d_5=0.0639$ | $n_3=1.70154$ | $\nu_3=41.1$ |
| $r_6=0.4159$ | | | |
| | $d_6=0.0261$ | | |
| $r_7=0.8450$ | | | |
| | $d_7=0.0389$ | $n_4=1.7847$ | $\nu_4=26.22$ |
| $r_8=0.1960$ | | | |
| | $d_8=0.2578$ | | |
| $r_9=0.6486$ | | | |
| | $d_9=0.0255$ | $n_5=1.7847$ | $\nu_5=26.22$ |
| $r_{10}=1.7995$. | | | |

* * * * *